(12) United States Patent
Rice

(10) Patent No.: US 7,005,836 B1
(45) Date of Patent: Feb. 28, 2006

(54) DIFFERENTIAL POWER SUPPLY CONTROLLER AND METHOD THEREFOR

(75) Inventor: Benjamin M. Rice, Attleboro, MA (US)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 6 days.

(21) Appl. No.: 10/937,586

(22) Filed: Sep. 10, 2004

(51) Int. Cl.
 *G05F 1/40* (2006.01)

(52) U.S. Cl. .................. 323/288; 323/283

(58) Field of Classification Search ............. 323/288, 323/283, 282
 See application file for complete search history.

(56) References Cited

U.S. PATENT DOCUMENTS 4,355,240 A * 10/1982 Hamilton .................. 307/44
6,342,822 B1 1/2002 So ............................ 332/109

* cited by examiner

*Primary Examiner*—Shawn Riley
(74) *Attorney, Agent, or Firm*—Robert F. Hightower

(57) ABSTRACT

In one embodiment, an error amplifier of a power supply controller forms differential error signals that are used to set an active and inactive state of a power switch.

20 Claims, 4 Drawing Sheets

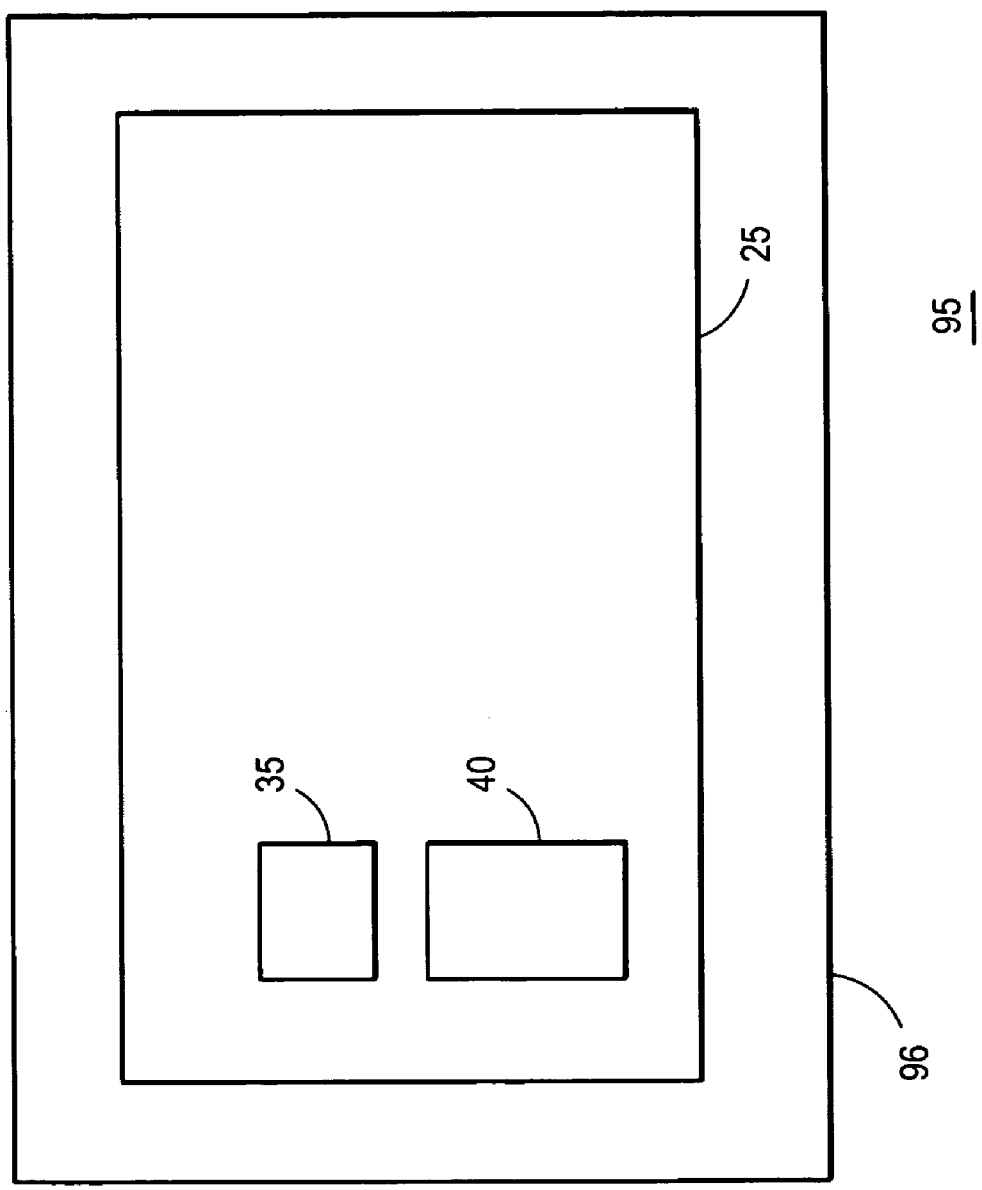

DIFFERENTIAL POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and circuits to form switching power supply controllers. In some cases, the switching power supply controllers utilized one of three different constant frequency modulation techniques in order to form drive signals that varied the duty cycle of a power transistor utilized to switch current to a load. One modulation technique, referred to as leading-edge modulation, used a single sloped falling edge ramp signal to vary the duty cycle, another technique, referred to as trailing-edge modulation, utilized a single sloped rising edge ramp signal to vary the duty cycle. The third modulation technique, referred to as dual edge modulation, required generating a dual sloped ramp signal having sloped rising and falling edges. One example of such a dual ramp modulation technique is disclosed in U.S. Pat. No. 6,342,822 issued to John So on Jan. 29, 2002, which is hereby incorporated herein by reference.

One problem with the dual ramp modulation technique was generating the sloped rising and falling edges. The circuitry required to generate the rising and falling edges was complex which increased the cost of the dual ramp modulation circuits. Additionally, the dual ramp modulation technique required extra logic circuits in order to prevent multiple drive signal pulses within one clock cycle. The extra logic further increased complexity and cost.

Accordingly, it is desirable to have a modulation method that operates at a rate that is determined by a periodic signal, that does not utilize a dual sloped edge ramp signal, that minimizes the amount of control logic, and that reduces the cost.

BRIEF DESCRIPTION OF THE DRAWINGS

FIG. 4 schematically illustrates an enlarged plan view of a semiconductor die that includes a portion of the power supply system of FIG. 1 in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
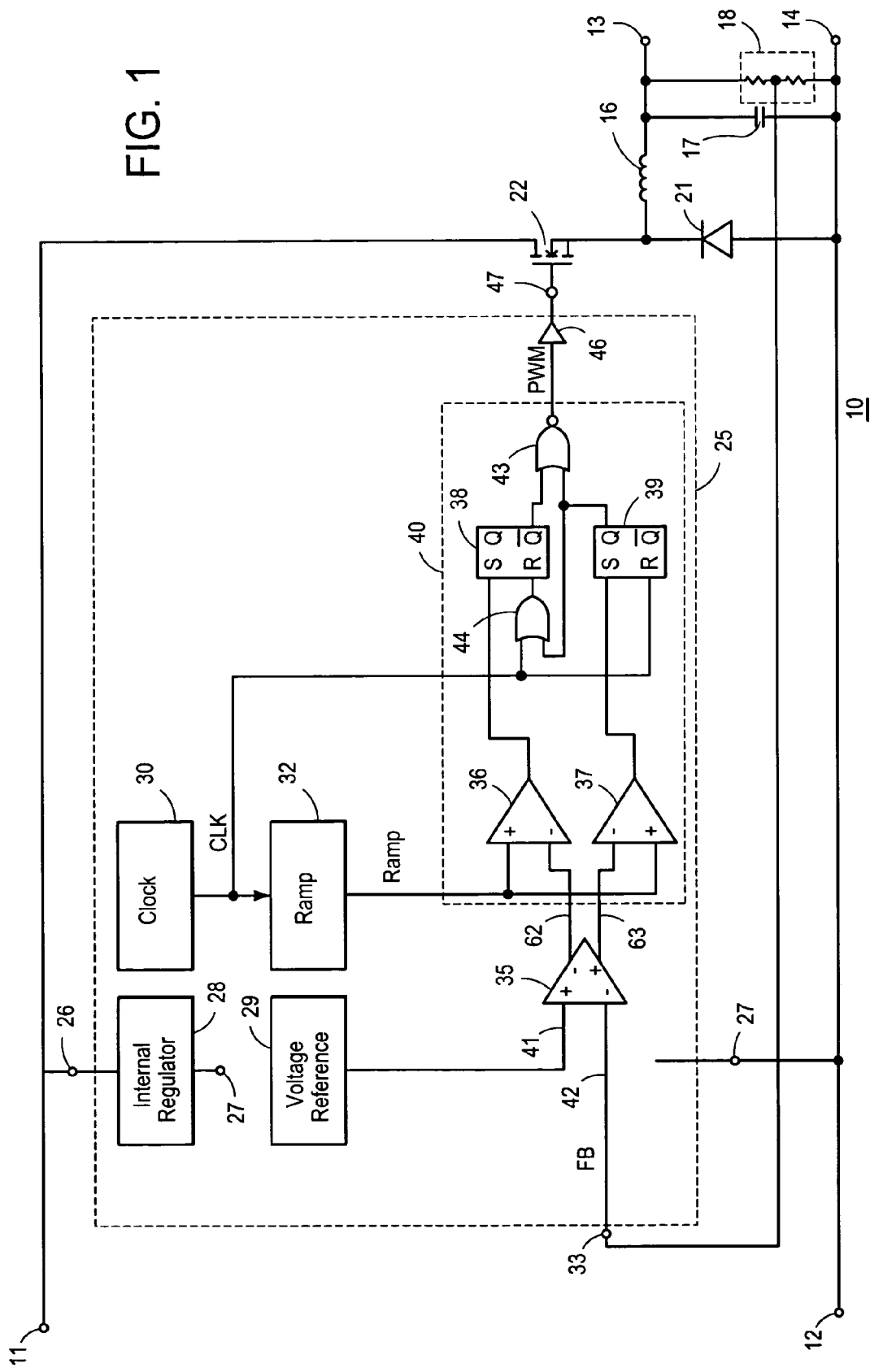
FIG. 1 schematically illustrates an embodiment of a portion of a power supply system in accordance with the present invention.

FIG. 1 schematically illustrates a portion of an embodiment of a power supply control system 10 having a power supply controller 25 that is operably configured to implement a dual edge modulation technique at a low cost. To facilitate implementing the dual edge modulation technique, controller 25 is also operably configured to generate differential error signals that are out of phase and that are utilized to control an active and inactive state of a switching control signal, for example a pulse width modulated (PWM) control signal.

System 10 receives power between a power input 11 and a power return 12 and generates an output voltage between an output voltage terminal 13 and an output common terminal 14. System 10 generally includes a flyback diode 21, an energy storage capacitor 17, a voltage divider 18, and an inductor 16 that is connected to a power switch such as a power transistor 22. Voltage divider 18 generally is connected to form a feedback signal (FB) that is representative of the output voltage between terminals 13 and 14. Such voltage dividers and feedback signals (FB) are well known to those skilled in the art. Inductor 16, capacitor 17, divider 18, transistor 22, and diode 21 are shown to assist in the explanation of controller 25. Transistor 22, divider 18, and diode 21 typically are external to controller 25 but in some systems one or some or all of transistor 22, divider 18, and diode 21 may be within controller 25.

Controller 25 receives power between a power input 26 and a power return 27. Input 26 typically is connected to input 11 and return 27 typically is connected to return 12. Controller 25 usually includes a feedback input 33 that is connected to receive the feedback signal (FB), and a pulse width modulated (PWM) drive output 47 that is connected to transistor 22. Controller 25 also includes a transistor driver 46, a reference generator or reference 29, a clock generator or clock 30, a ramp generator or ramp circuit 32, a pulse width modulated (PWM) controller 40, and a differential error amplifier 35. Generally, controller 25 also includes an internal regulator 28 that is operably connected to form an internal operating voltage that is utilized to operate the elements within controller 25 including PWM controller 40, reference 29, and amplifier 35. Regulator 28 is connected between input 26 and return 27 in order to receive input power. Reference 29 is configured to generate a stable reference voltage on an output of reference 29. Clock 30 generates a free running clock signal (CLK) that is utilized for controlling the operating rate of controller 40. The free running clock signal (CLK) generally has a low duty cycle in order to minimize the inactive time of the ramp signal generated by ramp 32. Typically the duty cycle is less than ten percent (10%) and preferably is less than five percent (5%). Ramp 32 utilizes CLK to generate a single sloped ramp signal (Ramp) that has a sloped rising edge and a substantially non-sloped falling edge. As is well known in the art, the falling edge of the ramp signal (Ramp) is not perfectly vertical but may take a short time period to transition to zero, however, the amount of time to transition to zero is significantly less, preferably greater than ninety percent (90%) less, than the time period of the sloped rising edge of the ramp signal (Ramp). Such single sloped rising edge ramp signals are well known to those skilled in the art. Ramp 32 utilizes the rising edge of CLK to form the substantially non-sloped falling edge of the ramp signal (Ramp) and utilizes the falling edge of CLK to initiate generating the sloped rising edge. Such ramp signal generators are well known to those skilled in the art. Differential error amplifier 35 has a non-inverting input 41, an inverting input 42, a non-inverting output 63, and an inverting output 62. Differential amplifier 35 is operably configured to receive the reference voltage from the output of reference 29 on input 41 and the feedback signal from input 33 on input 42, and responsively form a differential error signal that includes an on-state error signal on output 62 and an off-state error signal on output 63. Amplifier 35 is configured to form the on-state error signal with a first polarity with respect to a common mode voltage of amplifier 35 and to form the off-state error signal with a second polarity with respect to the common mode voltage. The polarity of the on-state and off-state error signals is opposite to each other relative to the common mode voltage. Hereinafter, such condition is referred to as the two signals being out-of-phase. Typically the magnitude of the gain of the on-state and off-state error signals is the substantially the same but the gains may be different in some embodiments. Those skilled in the art will realize that due to component tolerances and other variations it is difficult to form the signals exactly one hundred eighty degrees out-of-phase, thus, the on-state and off-state error signals may vary up to about plus or minus ten percent from exactly one hundred eighty degrees and still be considered substantially one hundred eighty degrees out-of-phase. Since amplifier 35 is a differential amplifier with differential outputs, the on-state and off-state error signals vary around the common mode voltage of amplifier 35 responsively to the value of the reference voltage and the FB signal. The value of the common mode voltage is usually somewhere between the minimum and maximum value of the ramp signal (Ramp) and preferably is approximately equal to the average value of Ramp. Those skilled in the art realize that amplifier 35 typically includes a frequency compensation network that is not shown in FIG. 1 for clarity of the explanation. Typically the frequency compensation network is connected between input 42 and output 63.

PWM controller 40 is configured to receive the on-state error signal from amplifier 35 and responsively form an active state of the PWM control signal (PWM), and receive the off-state error signal from amplifier 35 and responsively form an inactive state of PWM, thus, form the corresponding active and inactive state of the PWM drive signal on output 47 and the active and inactive state of transistor 22. Controller 40 includes an on-state comparator 36, an off-state comparator 37, an on-state latch 38, an off-state latch 39, a NOR gate 43, and an OR gate 44. Latches 38 and 39 are reset dominant.

Figure 2:
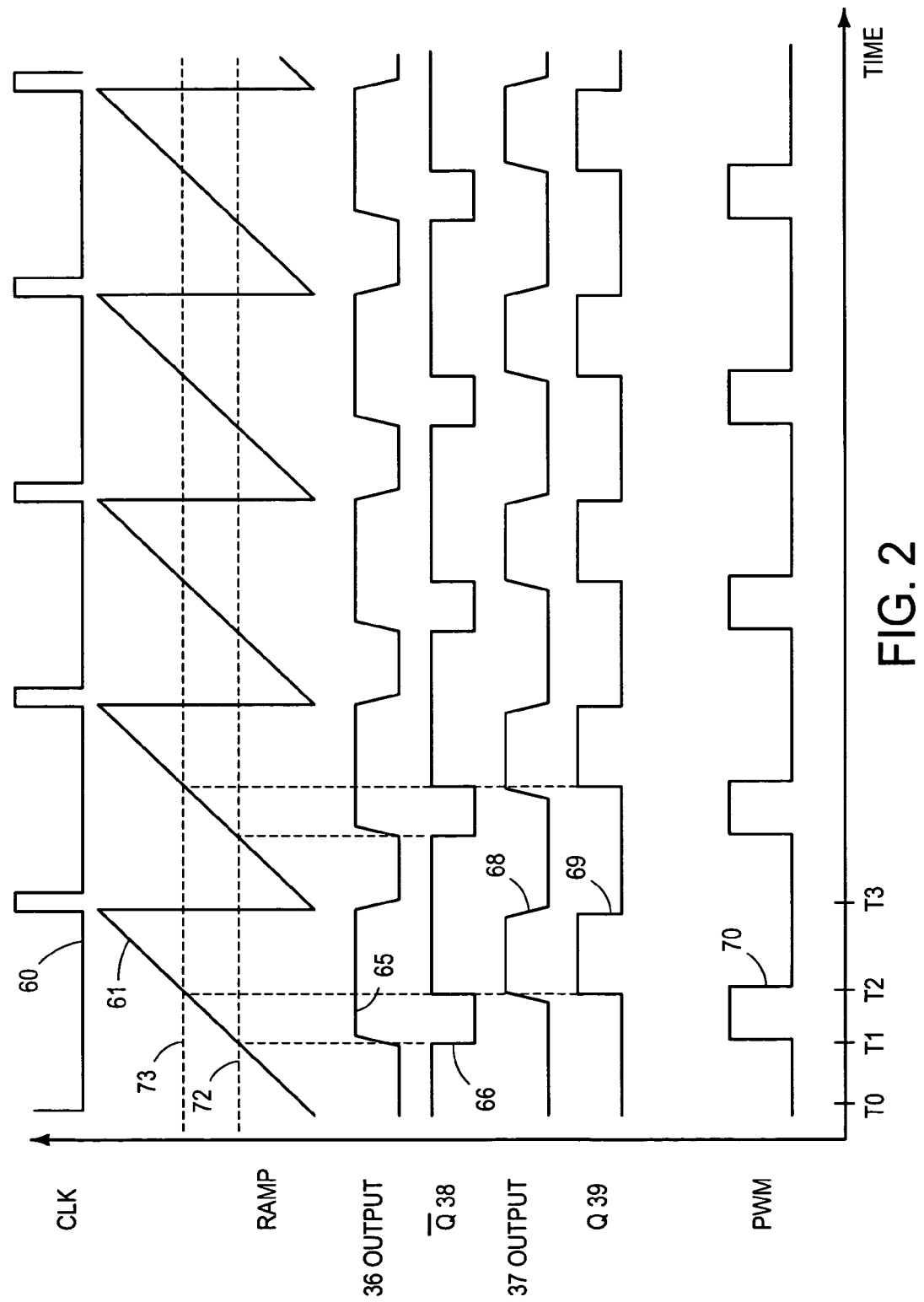
FIG. 2 is a graph having plots that illustrate some signals within the power supply controller of FIG. 1 in accordance with the present invention.

FIG. 2 is a graph having plots that illustrate some of the signals within controller 25 during a portion of the operation of controller 25. The abscissa illustrates time and the ordinate illustrates amplitude of various signals. This description has references to both FIG. 1 and FIG. 2. A plot 60 illustrates CLK, a plot 61 illustrates Ramp, a plot 72 represents the on-state error signal on output 62, a plot 73 represents a the off-state error signal on output 63, a plot 65 represents the output of comparator 36, a plot 66 represents the Q bar output of latch 38, a plot 68 represents the output of comparator 37, a plot 69 represents the Q output of latch 39, and a plot 70 illustrates the PWM control signal (PWM) on the output of gate 43. It should be noted that plots 72 and 73 illustrate the relative value of the on-state and off-state error signals for a given value of the feedback (FB) signal. Although not shown in FIG. 2 for clarity of the drawing, as the value of FB varies, the value at which plots 72 and 73 intersect plot 61 correspondingly vary. For example, if the value of the feedback voltage increases the value of the on-state error signal increases and the value of the off-state error signal decreases. At a time T0, the falling edge of CLK initiates ramp circuit 32 to generate the sloped rising edge of Ramp on the output of ramp circuit 32 as illustrated by plot 61. At a time T1, the value of Ramp is approximately equal to the value of the on-state error signal on output 62 which forces the output of comparator 36 high as indicated by plot 65. Since CLK is low, the high sets latch 38 forcing the Q bar output low and PWM high as illustrated by respective plots 66 and 70. The output of comparator 36 remains high until the value of Ramp decreases below the value of the on-state error signal on output 62 or until the value of the feedback voltage changes causing the value of the on-state error signal to increase to a value greater than the value of Ramp. At time T2, Ramp becomes substantially equal to the off-state error signal on output 63 which forces the output of comparator 37 high as illustrated by plot 68. The high on the output of comparator 37 sets latch 39 forcing the Q output high and PWM low as illustrated by plots 69 and 70. The high Q output of latch 39 is also received by gate 44 which forces the reset input of latch 38 high to reset latch 38 and force the Q bar output high. Keeping the reset input high also ensures that latch 38 does not become set while latch 39 is set. Forcing latch 38 to be reset while latch 39 is set prevents the simultaneous reset of latches 38 and 39 which could generate an unintended PWM pulse due to a race condition. The output of comparator 37 remains high until the value of Ramp decreases below the value of the off-state error signal on output 63 or until the value of the feedback voltage changes causing the value of the off-state error signal to increase to a value greater than the value of Ramp. At time T3, CLK goes high which resets ramp circuit 32 to force Ramp low and prepare for generating another sloped rising edge of the ramp signal (Ramp). CLK going high resets latch 39 and also resets latch 38 through gate 44. For the case where less than one hundred percent (100%) duty cycle is required, this ensures latch 39 gets reset in case ramp 61 never exceeds the off-state error signal. If one hundred percent (100%) duty cycle is acceptable, the Q output of latch 39 can be connected to the reset of latch 38 without gate 44. Resetting latch 38 forces the Q bar output high which forces PWM low through gate 43. This cycle repeats each time CLK goes high and then low. Those skilled in the art will realize that the slope of Ramp may be made proportional to the value of input voltage. Such a configuration, often referred to as feed forward, keeps the gain of the path from reference 29 to the output voltage constant.

In order to provide the hereinbefore described functionality, regulator 28 has an input connected to input 26 and a common terminal connected to return 27. Input 33 is connected to input 42 of amplifier 35. The output of reference 29 is connected to input 41 of amplifier 35. Output 62 of amplifier 35 is connected to the inverting input of comparator 36, and output 63 of amplifier 35 is connected to the inverting input of comparator 37. The output of ramp circuit 32 is commonly connected to a non-inverting input of comparators 36 and 37. The output of comparator 36 is connected to the set input of latch 38 which has the Q bar output connected to a first input of gate 43. The output of comparator 37 is connected to the set input of latch 39 which has the Q output commonly connected to a second input of gate 43 and to a first input of gate 44. The output of clock 30 is commonly connected to a second input of gate 44, to an input of ramp 32, and to the reset input of latch 39. The output of gate 44 is connected to a reset input of latch 38. The output of gate 43 is connected to an input of driver 46 which has an output connected to output 47 of controller 25.

Figure 3:
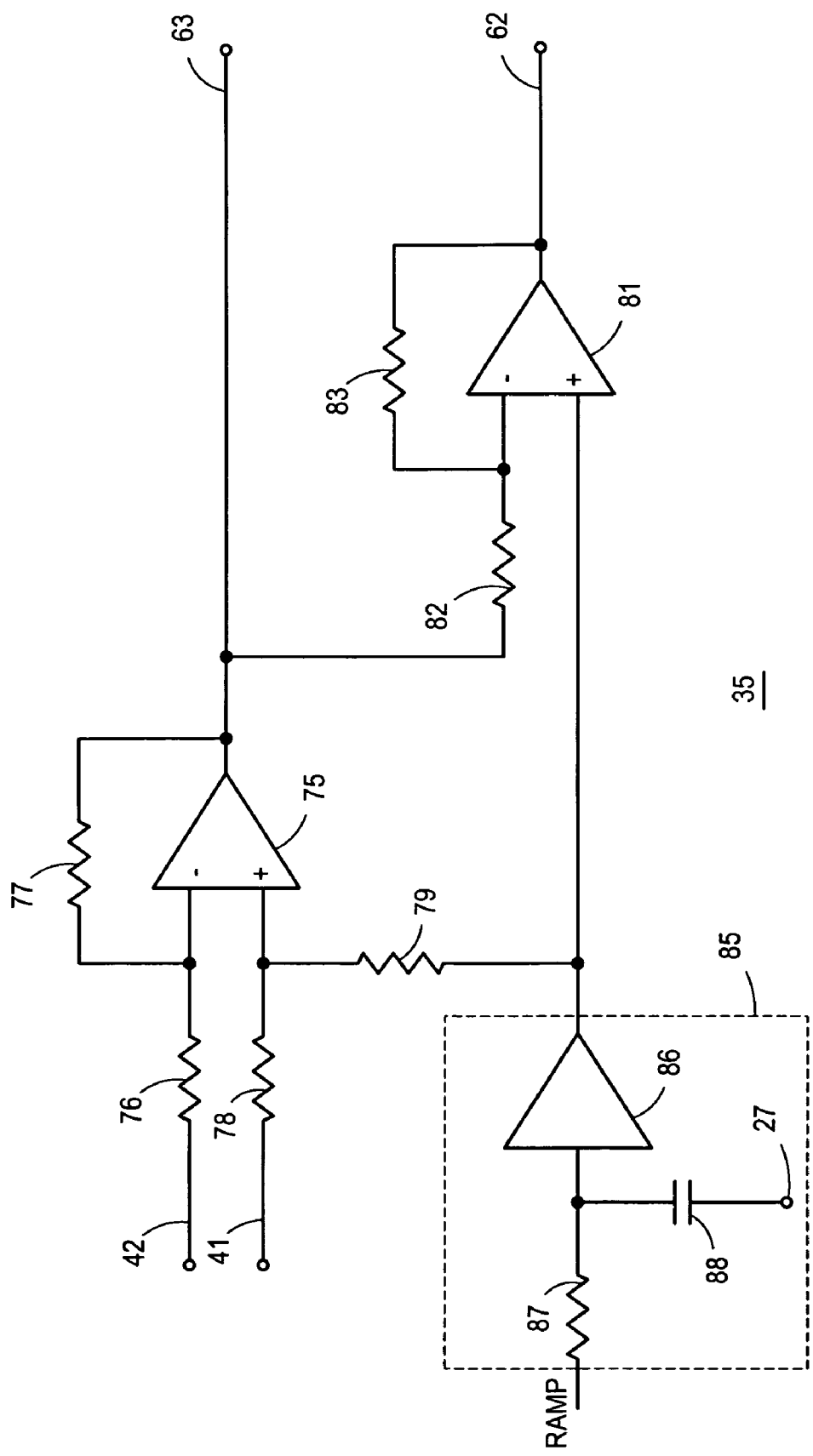
FIG. 3 schematically illustrates an embodiment of a portion of an error amplifier that is illustrated in FIG. 1 in accordance with the present invention.

FIG. 3 schematically illustrates a portion of one exemplary embodiment of a configuration of amplifier 35 that is described in the description of FIG. 1. In the exemplary embodiment, amplifier 35 includes a first operational amplifier 75 that is configured to subtract the value of FB from the value of the reference voltage and amplify the resulting signal to form the on-state error signal on output 63. The gain of amplifier 75 is determined by the value of resistors 76, 77, 78, and 79. In the preferred embodiment, resistors 76 and 78 have the same value and resistors 77 and 79 have the same value. A second operational amplifier 81 receives the output of amplifier 75 and inverts the output to form the off-state error signal. The gain of amplifier 81 typically is chosen to be unity in order to form the differential output signals. A bias circuit 85 provides the value of the common mode voltage for the outputs of amplifier 35. Bias circuit 85 includes a filter that averages the value of the ramp signal (Ramp) and uses the average value of Ramp as the common mode voltage. A buffer 86 buffers the averaged signal formed by the filter of resistor 87 and capacitor 88 from the input network of resistors 78 and 79.

In order to facilitate the functionality of amplifier 35, a first terminal of resistor 76 is connected to input 42 and a second terminal is connected to both the inverting input of amplifier 75 and to a first terminal of resistor 77. A second terminal of resistor 77 is commonly connected to the output of amplifier 75, to output 63, and to a first terminal of resistor 82. A second terminal of resistor 82 is connected to the inverting input of amplifier 81 and to a first terminal of resistor 83. A second terminal of resistor 83 is connected to output 62 and to the output of amplifier 81. A first terminal of resistor 78 is connected to input 41 and a second terminal is connected to both the non-inverting input of amplifier 75 and to a first terminal of resistor 79. A second terminal of resistor 79 is commonly connected to an output of buffer 86 and to a non-inverting input of amplifier 81. An input of buffer 86 is commonly connected to a first terminal of resistor 87 and to a first terminal of capacitor 88. A second terminal of capacitor 88 is connected to return 27 and a second terminal of resistor 87 is connected to the output of ramp circuit 32.

Those skilled in the art realize that the exemplary embodiment explained in the description of FIG. 3 is just one embodiment for configuring amplifier 35 and that other embodiments may be used. Another embodiment referred to as a differential output operational amplifier having a common mode feedback circuit is described in a book "CMOS Circuit Design, Layout, and Simulation", R Jacob Baker, Harry W. Li, and David E. Boyce, IEEE Press, 1998, pp 664–674.

FIG. 4 schematically illustrates an enlarged plan view of a portion of an embodiment of a semiconductor device 95 that is formed on a semiconductor die 96. Controller 25 is formed on die 96. Die 96 may also include other circuits that are not shown in FIG. 4 for simplicity of the drawing. Controller 25 and device 95 are formed on die 96 by semiconductor manufacturing techniques that are well known to those skilled in the art.

In view of all of the above, it is evident that a novel device and method is disclosed. Included, among other features, is forming a differential error signal having a first error signal with a first phase a second error signal that is out-of-phase with the first error signal. The two error signals function to control the active and inactive states of the power supply as a function of the value of the feedback voltage. Such operation provides the advantage of quicker response to power converter operating conditions, which would otherwise require greater storage of energy within the converter at a higher cost and larger size. Thus, implementing the two error signals minimizes the circuitry and reduces the costs of the power supply controller.

While the invention is described with specific preferred embodiments, it is evident that many alternatives and variations will be apparent to those skilled in the semiconductor arts. For example, an implementation of a differential amplifier is illustrated, but the differential amplifier may also have various other configurations as long as the two error signals are generated. Although the ramp signal is illustrated with a sloped rising edge, a ramp signal with a sloped falling edge instead of the sloped rising edge may be used if the inverting and non-inverting inputs of the comparators are swapped and the ramp circuitry is adjusted to be properly controlled by the clock. Additionally, the word "connected" is used throughout for clarity of the description, however, it is intended to have the same meaning as the word "coupled". Accordingly, "connected" should be interpreted as including either a direct connection or an indirect connection. For example, the gate of transistor 22 is coupled or indirectly connected to the PWM signal through driver 46.

The invention claimed is:

1. A method of forming a power supply controller comprising:
    configuring the power supply controller to receive a feedback signal that is representative of an output voltage;
    coupling an error amplifier to receive the feedback signal and a reference signal and responsively form a differential error signal having a first error signal with a first phase that is representative of a difference between the reference signal and the feedback signal and having a second error signal that is substantially one hundred eighty degrees out-of-phase with the first error signal;
    configuring the power supply controller to form an active state of a PWM control signal responsively to the first error signal; and
    configuring the power supply controller to form an inactive state of a PWM control signal responsively to the second error signal.

2. The method of claim 1 wherein configuring the power supply controller to form an active state of a PWM control signal responsively to the first error signal includes coupling a first PWM comparator to receive the first error signal and a ramp signal and responsively initiate the active state of the PWM control signal.

3. The method of claim 2 wherein coupling the first PWM comparator to receive the first error signal and the ramp signal and responsively initiate the active state of the PWM control signal includes configuring the power supply controller to store a state of the comparator and use the stored state to initiate the active state of the PWM control signal.

4. The method of claim 2 wherein configuring the power supply controller to form the inactive state of the PWM control signal responsively to the second error signal includes coupling a second PWM comparator to receive the second error signal and the ramp signal and responsively initiate the inactive state of the PWM control signal.

5. The method of claim 1 wherein coupling the error amplifier to receive the feedback signal and the reference signal includes coupling a differential amplifier having differential outputs to receive a ramp signal having a single sloped edge.

6. The method of claim 1 wherein configuring the power supply controller to form the inactive state of the PWM control signal includes configuring the power supply controller to use the inactive state to inhibit forming the active state during the inactive state.

7. The method of claim 6 wherein configuring the power supply controller to use the inactive state to inhibit forming the active state during the inactive state includes configuring the power supply controller to store the inactive state and use the stored inactive state to inhibit forming the active state.

8. A power supply control method comprising:
generating a feedback signal that is representative of an output voltage of a power supply;
generating a differential error signal having a first error signal with a first polarity that is representative of a difference between a reference signal and the feedback signal and having a second error signal that is out-of-phase with the first error signal; and
using the first error signal to form an active state of a PWM control signal; and
using the second error signal to form an inactive state of a PWM control signal.

9. The method of claim 8 wherein using the first error signal to form the active state of the PWM control signal includes comparing the first error signal to a variable reference signal and using the result of the comparison to form the active state of the PWM control signal.

10. The method of claim 8 further including maintaining the inactive state of the PWM control signal during at least one active state of the first error signal.

11. The method of claim 8 wherein generating the differential error signal includes generating the differential error signal with a differential amplifier.

12. The method of claim 8 wherein using the first error signal to form the active state of the PWM control signal includes comparing the first error signal to a single slope ramp signal.

13. The method of claim 8 wherein using the second error signal to form the inactive state of the PWM control signal includes storing the active state of the second error signal in a first memory and using the stored active state to maintain the inactive state of the PWM control signal.

14. The method of claim 8 wherein generating the differential phase error signal having the first error signal with the first polarity that is representative of the difference between the reference signal and the feedback signal and having the second error signal that is out-of-phase with the first error signal includes generating the second error signal to be substantially one hundred eighty degrees out-of-phase with the first error signal.

15. A power supply controller comprising:
an error amplifier operably coupled to receive a feedback signal and a reference signal and responsively form a differential error signal having a first error signal and a second error signal;
a first PWM comparator coupled to receive the first error signal and responsively initiate an active state of a PWM control signal; and
a second PWM comparator coupled to receive the second error signal and responsively initiate an inactive state of the PWM control signal.

16. The power supply controller of claim 15 wherein the error amplifier is a differential amplifier having a first differential output configured to generate the first error signal having a first phase, and having a second differential output configured to generate the second error signal having a second phase that is different from the first phase.

17. The power supply controller of claim 16 wherein the first PWM comparator coupled to receive the first error signal and responsively initiate the active state includes the first PWM comparator coupled to receive the first error signal and a ramp signal having single sloped edge.

18. The power supply controller of claim 17 further including a first storage element coupled to store a state of the first comparator.

19. The power supply controller of claim 18 further including a second comparator coupled to receive the second error signal and the ramp signal and responsively initiate the inactive state.

20. The power supply controller of claim 19 further including a second storage element coupled to store a state of the second comparator and coupled to change a state of the first storage element.

* * * * *